Jan. 21, 1930.  F. M. WRIGHT  1,744,601
HAND PACK FILLER
Filed Jan. 11, 1924    4 Sheets-Sheet 1
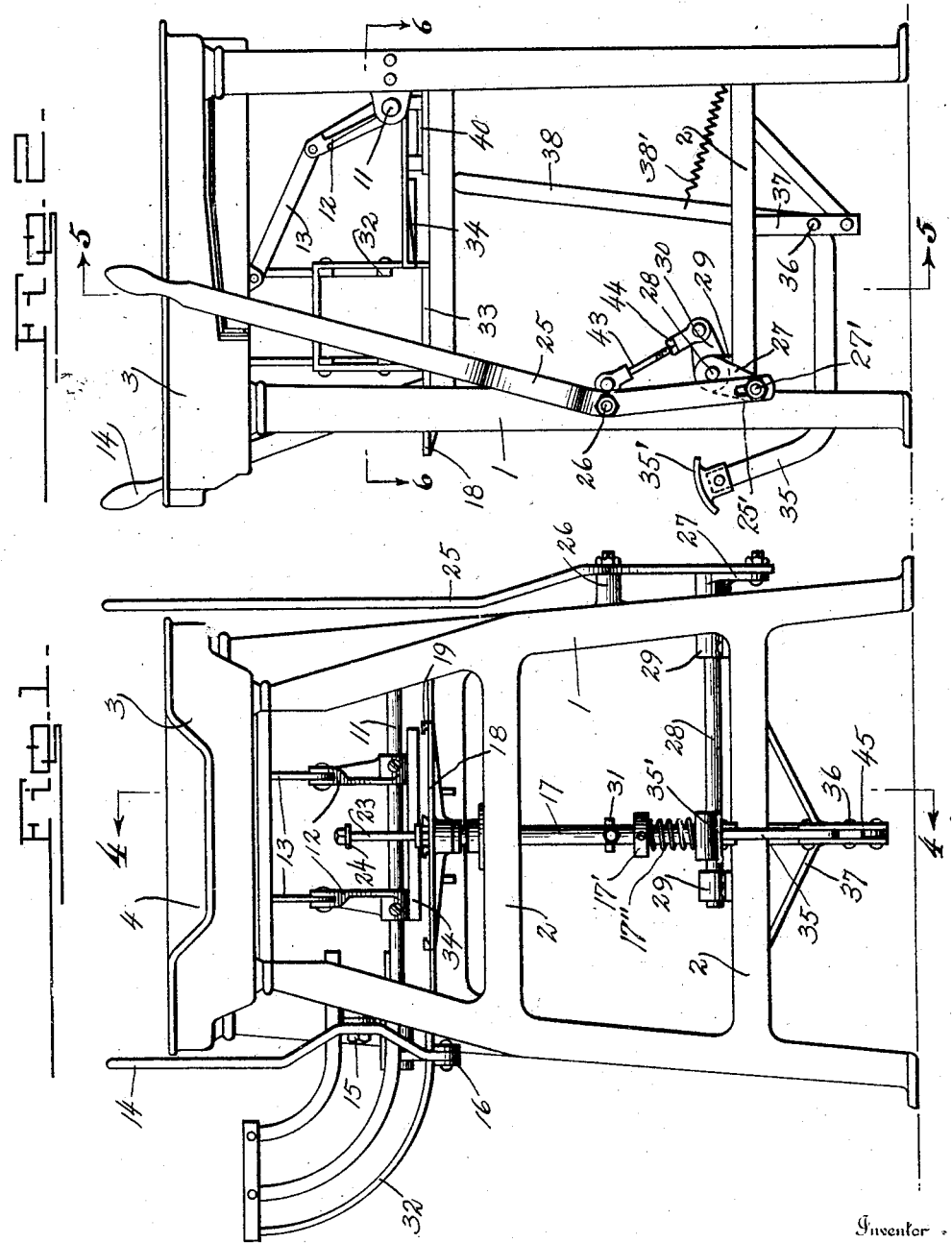
Inventor
Frank M. Wright
By Jaerbi & Jaerbi
Attorneys Jan. 21, 1930.  F. M. WRIGHT  1,744,601
HAND PACK FILLER
Filed Jan. 11, 1924    4 Sheets-Sheet 2
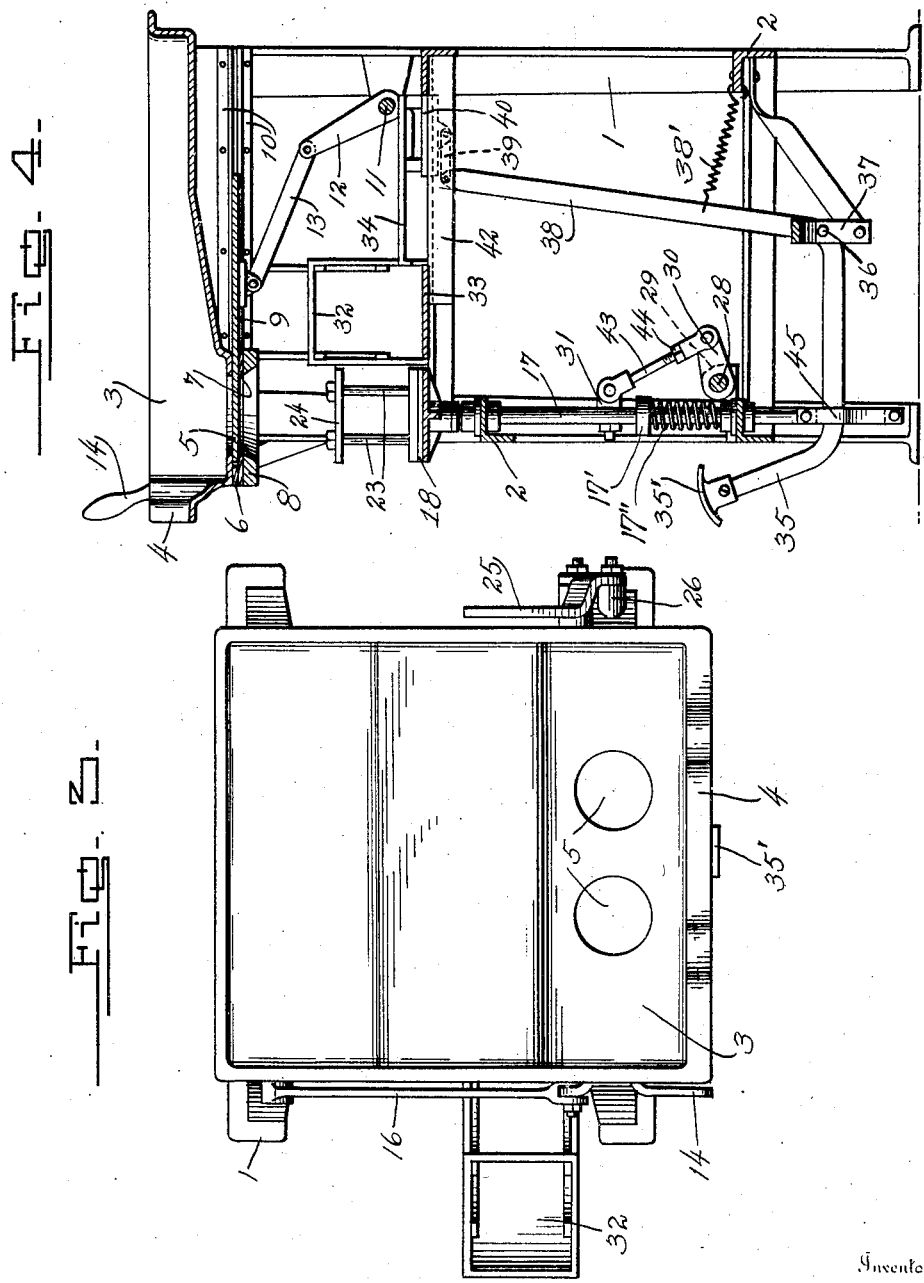
Inventor
Frank M. Wright
By Jacobi & Jacobi
Attorneys

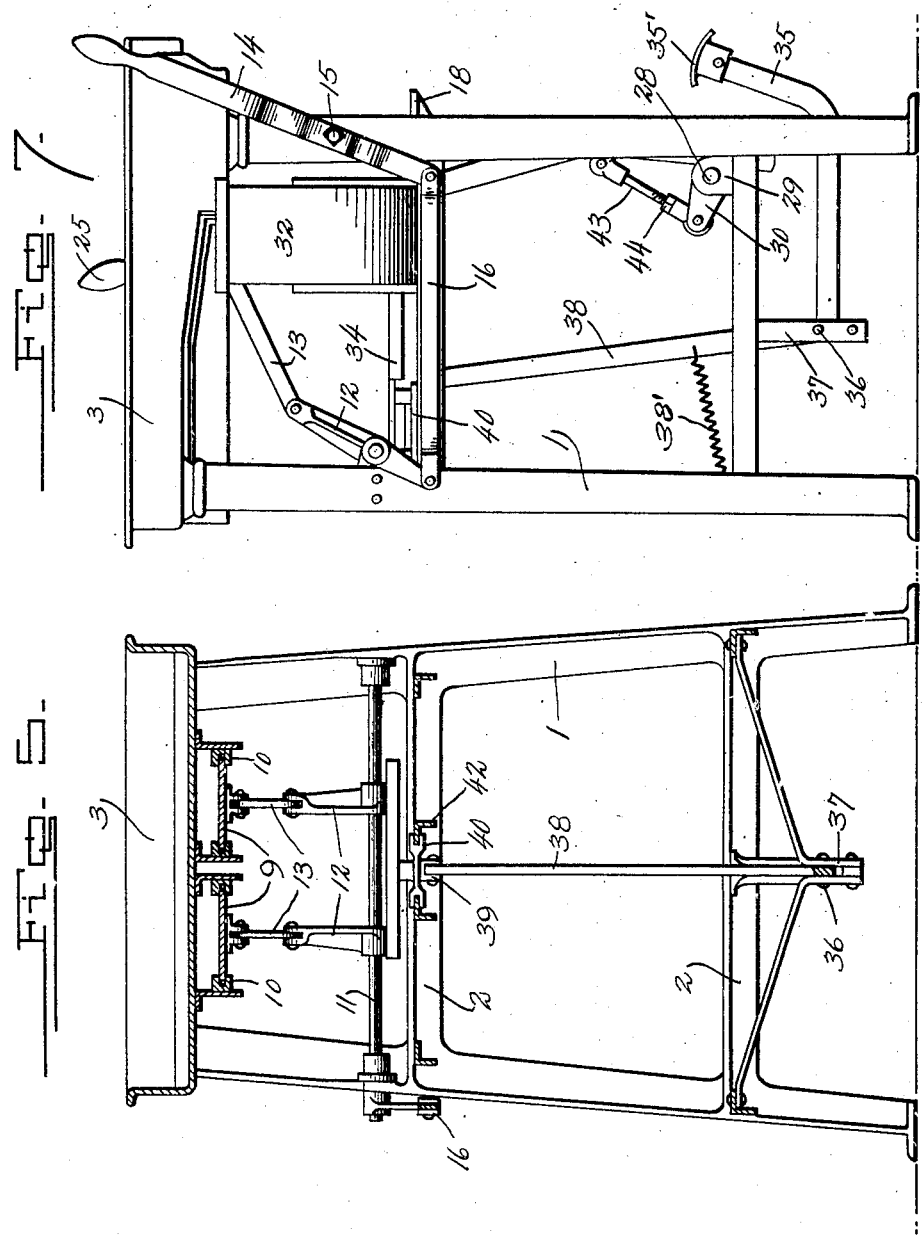

Jan. 21, 1930.    F. M. WRIGHT    1,744,601
HAND PACK FILLER
Filed Jan. 11, 1924    4 Sheets-Sheet 4
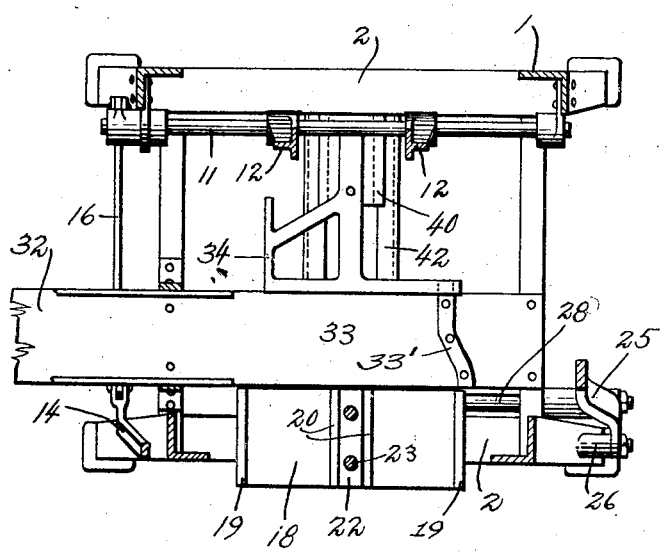
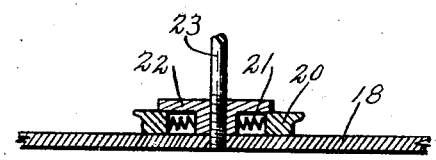
Inventor
Frank M. Wright
By Jaerli & Jaerli
Attorneys Patented Jan. 21, 1930

1,744,601

UNITED STATES PATENT OFFICE

FRANK M. WRIGHT, OF OLEAN, NEW YORK

HAND PACK FILLER

Application filed January 11, 1924. Serial No. 685,586.

This invention relates to a hand pack filler and has for its principal object to provide a simple and efficient device which is especially adapted for use in conjunction with the canning of vegetables and other food products wherein means is provided for automatically holding the can in position while the same is being filled, and furthermore manually operated means for controlling the feeding and discharging of said cans in said machine.

Another important object of the invention is to provide a hand pack filler of the above mentioned character, whereby means is provided for filling more than one can at a time and thereby saving considerable time and labor as well as expense.

A still further object of the invention is to provide a hand pack filler of the above mentioned character, wherein manually or power operated means is provided for cutting off the food products which are placed in the cans at predetermined times and furthermore the filling means includes a separate device for insuring the proper filling of the cans.

An equally important object of the invention is to provide a hand pack filler of the above mentioned character, wherein manually or power operated means is provided for placing said cans in position to be filled, and this operation automatically causes the locking of the can feeding means so as to provide for the proper and efficient actuation of the filling means.

Another object of the invention is to provide a hand pack filler wherein the cans are fed to the can receiving platform by gravity and are placed upon a table and locked thereon automatically whereby the same may be brought into position with the receptacle containing the products to be placed into the can.

A further object of the invention is to provide a hand pack filler which is simple in construction, inexpensive, strong and durable, and further well adapted for the purpose for which it is designated.

Other objects and advantages of this invention will become apparent during the course of the following description.

In the accompanying drawings forming a part of the specification, and in which like numerals designate like parts throughout the same, Figure 1 is a front elevation of my invention, Figure 2 is a side elevation, Figure 3 is a plan view thereof, Figure 4 is a vertical section taken on line 4—4 of Fig. 1, Figure 5 is a vertical section taken on the line 5—5 of Fig. 2, Figure 6 is a horizontal section taken on line 6—6 of Fig. 2, Figure 7 is an elevation of the side opposite that shown in Figure 2;

Figure 8 is a fragmentary sectional view of the can retaining means.

In the drawings wherein for the purpose of illustration is shown the preferred embodiment of my invention, the numeral 1 designates generally the frame which is provided with the usual transversely extending cross pieces which act as braces therefor. The upper portion of the frame 1 converges in the manner clearly shown in Fig. 1 of the drawing and disposed thereon is the hopper or receptacle 3. This hopper 3 is adapted to hold therein the food products which are to be placed into the cans to be filled in the manner as will be hereinafter more fully described.

The front portion of the hopper 3 is cut away as shown at 4 in the drawings and the purpose of this arrangement is to provide an enlarged opening or cut away portion whereby the operator of the machine may have ready access to the interior of the hopper and the contents contained therein while the machine is in operation so as to insure the proper feeding of the contents within the hopper through the openings 5 provided in the bottom thereof.

Also supported on the upper portion of the frame 1 and immediately adjacent the bottom of the hopper 3 is the centering means designated by the numeral 6. This centering means is also provided with openings 7 which are adapted to register with the openings 5 provided in the bottom of the hopper.

For the purpose of controlling the supply of the food products from the hopper into the cans and cutting off the supply after the same have been filled, I provide the sliding cut offs 9. These sliding cut offs 9 are in the form of plates formed of any suitable material preferably aluminum and operate in guides 10 provided in the centering ring 6. These aluminum cut offs 9 close the openings 7 provided in the centering ring and for the purpose of actuating these cut offs 9 I provide a suitable and simple manually operated means.

The operating means for the cut offs 9 include a transversely extending rock shaft 11 mounted in the upper portion of the frame 1 and keyed thereto are the links 12. These links 12 extend upwardly from the shafts 11 and have their upper ends bifurcated to receive one end of the auxiliary links 13. These auxiliary links 13 being connected at their upper ends to the bottom faces of the cut off plates 9 in any suitable manner, and for the purpose of actuating the shaft 11, the hand lever 14 is provided, the same being pivoted intermediate its ends to the frame 1 as shown at 15, and the lower free end thereof being connected to the rocker arm 16 which is carried by the outer free end of the transverse shaft 11. Normally the cut offs are out of registry with the openings 7 provided in the centering means 6, but when it is desired to close these openings, the lever 14 is pulled forwardly and will consequently cause the shaft 11 to rock, and in turn move the cut off plates 9 into position over the openings 7 in such a manner as to prevent the further discharge of the contents within the hopper through the openings provided in the bottom thereof and through the openings in the centering means and into the cans supported upon the table, to be more fully described.

Extending vertically in the forward portion of the frame 1 is the shaft 17 and this shaft 17 is adapted to slidably be supported in the cross pieces or transverse supporting bars 2 of the frame 1 in the manner as clearly shown in the drawings. Mounted on the vertical shaft 7 on the upper end thereof is the can supporting table 18. This table is keyed to the shaft 17 in any suitable manner and is provided on its upper face adjacent the periphery thereof at spaced intervals, with the retaining lugs 19. Similar retaining lugs 20 are associated with the central portion of the table and are adapted to be urged outwardly into engagement with the bottom flanges of the cans when the latter are placed on the table, by means of the coil springs 21. These central retaining lugs are held in position by means of a gib 22, and the threaded pins 23 which are adapted to be threaded through the gib 22 and into the can supporting table 18.

A collar 17' is mounted upon the shaft 17 and a coil spring 17'' is interposed between the frame 1 and the collar 17'. The spring 17'' has a tendency to hold the shaft 17 and the parts mounted thereon in an elevated position after the shaft has been lifted by swinging the lever 25 as will be hereinafter explained.

Extending across the upper ends of the pins 23 is the retaining plate 24 and the purpose of this plate is to provide a means for engagement with the upper portion of the cans, when the same are in position upon the table 18 to hold same in vertical alignment. It is to be further understood that the cans are held in position upon the table 18 through the medium of the retaining lugs 19 and 20 respectively, the former being stationary while the latter are adapted to be brought into slidable engagement with the cans through the action of the springs 21.

In order to move the shaft 17 vertically in the frame 1 so as to bring the cans into position with respect to the centering means 6, so that the upper portions of the cans will fit within the openings 7 provided therein, I provide the lever 25 which is pivoted intermediate its ends upon the stud 26, the latter being carried by the outer side of the frame 1 in the manner as clearly shown in Fig. 1 of the drawings. The lower end of the lever 25 is connected to the rocker arm 27. This rocker arm 27 is carried by the outer end of the transversely extending shaft 28 mounted in the lower portion of the frame 1 and supported in suitable journal boxes 29 carried by the lowermost cross piece 2. This shaft 28 is provided with an extension 30 which extends laterally therefrom, and this extension is adapted to cooperate, as hereinafter and more fully described with a suitable stud 31 provided upon the lower portion of the vertically extending shaft 17 whereby upon forward movement of the lever 25, the shaft 28 will be rocked so as to cause the lateral extension 30 and the stud 31 to raise the shaft 17 upwardly in the frame so as to cause the table 18 and the cans supported thereon to be brought into engagement with the centering means and hopper. The vertical shaft 17 is connected by a stud 31 to the lift arm 43 and an adjusting nut 44. The purpose of this adjusting nut is to provide means whereby the lift arm 43 may be adjusted to lift the table to a desired level when the vertical shaft 17 is moved upwardly through the medium of the lever 25. The lever 25 is provided with a slot 25' which receives a bolt 27' carried by the rocker arm 27. Consequently, when the lever 25 is swung, the arm 27 is rocked so that the extension 30 and the parts connected thereto are moved and the shaft 17 is moved from a lower to an upper position. The loop 45, hereinafter described, and which is connected with the lower end of the shaft 17 receives therethrough the foot lever 35, as clearly shown in Figure 4 of the drawings.

Supported in the frame 1 adajacent the upper end thereof and arranged so as to cooperate with a platform hereinafter to be more fully described, is the chute 32. This chute is in the form of an elbow and is of such a size as to receive a number of empty cans which are to be fed onto the stationary can platform and from there onto the table 18. The stationary can platform designated by the numeral 33 is disposed in the rear of the table 18 and below the delivering end of the chute 32, as shown in Fig. 4 of the drawings. For the purpose of feeding empty cans from the platform 33 onto the table 18, a can sliding or pusher member 34 is provided. For the purpose of actuating this can pusher 34, I provide the foot lever 35. This lever 35 is pivoted as shown at 36 in the drawings in a suitable hanger 37 carried by the lower rear portion of the frame 1, and a portion of the lever 35 at its pivotal mounting extends upwardly as shown at 38 in the drawings and the upper end of the extension 38 is connected to a suitable link 39 the opposite end of the link 39 being connected to a cross head 40 associated with the bottom of the pusher member 34. The pusher member 34 is adapted to cooperate with the stationary platform 33 which is supported on the frame 1 and located adjacent the table 18 and the forward or delivery end of the chute 32. The cross head 40 which is carried by the bottom of the can pusher member, is adapted to cooperate with the guides 42, these guides 42 being in the form of angle irons supported in spaced relation on the frame and adapted to operate in grooves provided in the sides of the cross head whereby the sliding movement of the can pusher member 34 is obtained.

A spring 38' is connected at one end with the frame 1 and at its other end with the intermediate portion of the extension 38 of the foot lever 35. The spring 38' has a tendency to return the lever 35 to its normal elevated position as best shown in Figure 4 of the drawings. A strip 33' (see Figure 6 of the drawing) is mounted upon the platform 33 and serves to limit the movement of the cans or containers along the platform 33.

The can pusher 34 is adapted to be moved forward by operation of the foot pedal 35 and this will cause two cans to be moved from the stationary platform 33 onto the table 18, and during this operation will prevent the entrance of the other cans in the chute from coming in contact with the cans already on the stationary platform. This operation, however, will be more fully described in the following paragraph.

The vertical shaft 17 which carries the table 18 at its upper end is adapted to be held in its upwardly extended position by means of a lift arm whereby the cans are held on the table 18 in locked engagement by means of the retaining lugs 19 and 20 when they are in engagement with the openings in the centering means 6 and fitting against the rubber gasket 8 will be held in such a locked position so as to insure the proper filling of the cans.

The vertical shaft 17 is furthermore connected to the lever 35 which is provided with the treadle 35' at its outer free end, and the purpose of this connection is to provide a means whereby the can pusher 34 will be actuated upon the upward movement of the shaft 17 and the table 18 carried thereby and thereby permit the entrance of the cans from the chute 32 to the can receiving platform 33. It being understood that the shaft and table must be in their lowermost position to enable the foot lever 35 to be actuated so as to move the can pusher 34 forward so as to cause the feeding of the empty cans upon the table and at the same time force the filled cans from the table onto a suitable conveyor not shown whereby the filled cans are conveyed to the suitable machine for closing the same. As this feature forms no important part of the present invention, it is not thought necessary to show the conveying means for feeding the filled cans out of the machine. This arrangement prevents any possibility of the foot lever 35 being actuated accidentally while the cans on the table 18 are disposed within the centering ring and are being filled for the reason that the lift arm 43 when thrown to its uppermost position and slightly beyond the center functions as a toggle and holds the shaft in its upper position, and the shaft being connected to the lever 35 will prevent the foot pedal from actuating unless the shaft is lowered.

The forward portion of the foot lever 35 extends through a suitable clevis 45 carried by the lower end of the shaft 17 for the purpose of permitting the return movement of the can pusher 34 when the shaft 17 and table 18 are raised in the frame.

The empty cans are placed in the chute 32 with the shaft 17 in its lowermost position, two cans are fed from the stationary platform 33 onto the table 18 by actuation of the foot pedal 35' which causes the pusher 34 to move the cans from the stationary platform onto the table. With the two cans arranged on the table in the manner above described, the lever 25 is then pulled forwardly and this results in the shaft 17 being raised so as to cause the open end of the cans to enter the openings 7 provided in the centering means 6 and the upper free edges of the cans are adapted to engage the same whereby the cans will be in registry with the openings provided in the bottom of the hopper 3. The forward movement of the edge of the can pusher 34 simultaneously prevents the feeding of the cans from the chute 32 onto the stationary platform 33 until the can pusher is returned whereupon the chute 32 is opened to again permit cans to enter on the stationary platform 33.

After the cans have been filled to the proper amount, the lever 14 is then actuated so as to move the sliding cut offs 9 which work in the guides 10 and will thereby cut off the supply from the hopper, and the lever 25 is then returned to its normal position and thereby causes the shaft 17 to move downwardly whereby the filled cans which are mounted on the table 18 will be brought out of engagement with the centering means and so that the table will return to its normal height, that is to say in alignment with the stationary platform 33. With the filled cans resting on the table 18 the latter being in its normal position, the foot pedal 35' is again actuated to feed two empty cans from the stationary platform onto the table 18 and the empty cans will force the filled cans to become disengaged from the supported position on the table.

When the empty cans are in position on the table 18 it is, of course, presumed that the lever 14 is returned to its normal position so as to permit the contents within the hopper to be discharged into the empty cans when the same are locked in position within the centering means 6. This operation may be repeated as many times as necessary until the desired number of cans have been filled and it will thus be seen that the operator of the machine will not in any way have to touch the cans with his hands, assuring the canner of the proper holding of the cans while the same is being filled in a simple and comparatively quick manner.

I claim:

1. In a can filling machine, a can receiving table, a can pusher mounted for movement transversely of the table, fixed can guiding lugs mounted in parallel relation upon the the table, a gib mounted upon the table between the lugs, movable can guiding lugs mounted upon the table and partially disposed under the gib and springs interposed between the gib and the movable lugs.

2. In a can filling machine a can carrying platform, a can pusher mounted for movement transversely of the platform, means for projecting the can pusher across the platform, a treadle operatively connected with said means, a can receiving table located at the edge of the platform and mounted for movement vertically of the path of movement of the can pusher, means for elevating the table and a clevis means loosely connecting the table elevating means with the treadle.

In testimony whereof I affix my signature.

FRANK M. WRIGHT.